(12) United States Patent
Lee et al.

(10) Patent No.: US 10,200,160 B2
(45) Date of Patent: Feb. 5, 2019

(54) METHOD FOR TRANSMITTING MULTIPLEXED HARQ FEEDBACKS IN A CARRIER AGGREGATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/538,060

(22) PCT Filed: Jan. 13, 2016

(86) PCT No.: PCT/KR2016/000356
§ 371 (c)(1),
(2) Date: Jun. 20, 2017

(87) PCT Pub. No.: WO2016/114587
PCT Pub. Date: Jul. 21, 2016

(65) Prior Publication Data
US 2018/0013519 A1 Jan. 11, 2018

Related U.S. Application Data

(60) Provisional application No. 62/103,576, filed on Jan. 15, 2015.

(51) Int. Cl.
*H04L 1/18* (2006.01)
*H04L 5/00* (2006.01)

(52) U.S. Cl.
CPC .............. *H04L 1/1812* (2013.01); *H04L 1/18* (2013.01); *H04L 1/1822* (2013.01);
(Continued)

(58) Field of Classification Search
CPC ........................... H04L 1/1893; H04L 1/1812
(Continued)

(56) References Cited

U.S. PATENT DOCUMENTS 9,544,885 B2 * 1/2017 You ........................ H04J 11/00
2011/0243066 A1 * 10/2011 Nayeb Nazar .......... H04L 1/007
370/328

(Continued)

FOREIGN PATENT DOCUMENTS

WO WO 2014/017746 A1 1/2014
WO WO 2014/021631 A1 2/2014
WO WO 2014/073804 A1 5/2014

*Primary Examiner* — John J Lee
(74) *Attorney, Agent, or Firm* — Birch, Stewart, Kolasch & Birch, LLP

(57) ABSTRACT

The present invention relates to a wireless communication system. More specifically, the present invention relates to a method and a device for transmitting multiplexed HARQ feedbacks in a carrier aggregation system, the method comprising: configuring a first Physical Uplink Control Channel (PUCCH) group and a second PUCCH group, wherein at least two cells are configured with PUCCH resources in each of the first PUCCH group and the second PUCCH group; generating a first Hybrid-ARQ (HARQ) feedback by multiplexing HARQ feedbacks of all HARQ processes of all cells belonging to the first PUCCH group; generating a second HARQ feedback by multiplexing HARQ feedbacks of all HARQ processes of all cells belonging to the second PUCCH group; selecting a first cell among the at least two cells with PUCCH resources in the first PUCCH group; selecting a second cell among the at least two cells with PUCCH resources in the second PUCCH group; and transmitting the first HARQ feedback on the first cell and the second HARQ feedback on the second cell.

20 Claims, 9 Drawing Sheets

(52) U.S. Cl.
CPC .......... *H04L 1/1861* (2013.01); *H04L 1/1893* (2013.01); *H04L 5/00* (2013.01); *H04L 5/0055* (2013.01); *H04L 5/001* (2013.01)

(58) Field of Classification Search
USPC ........ 455/500, 422.1, 550.1, 24, 452.1, 509, 455/67.11
See application file for complete search history.

(56) References Cited

U.S. PATENT DOCUMENTS

2014/0192738 A1    7/2014   Nam et al.
2014/0349713 A1   11/2014   Yamada

\* cited by examiner

[Fig. 1]
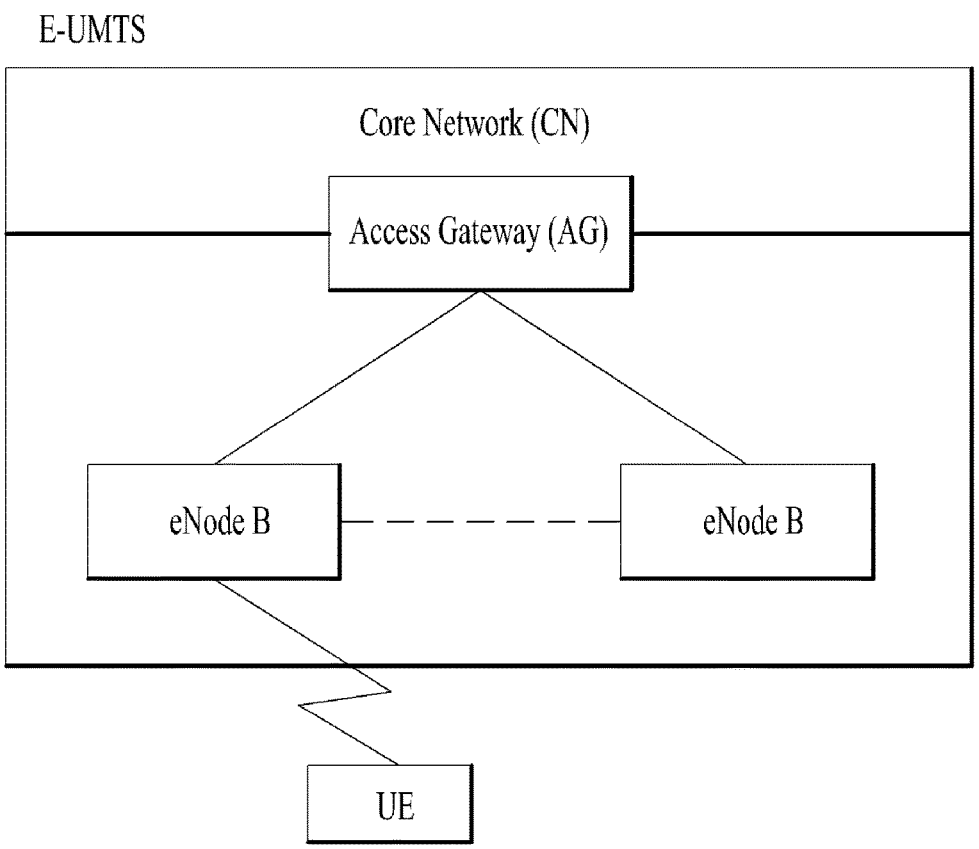

[Fig. 2a]
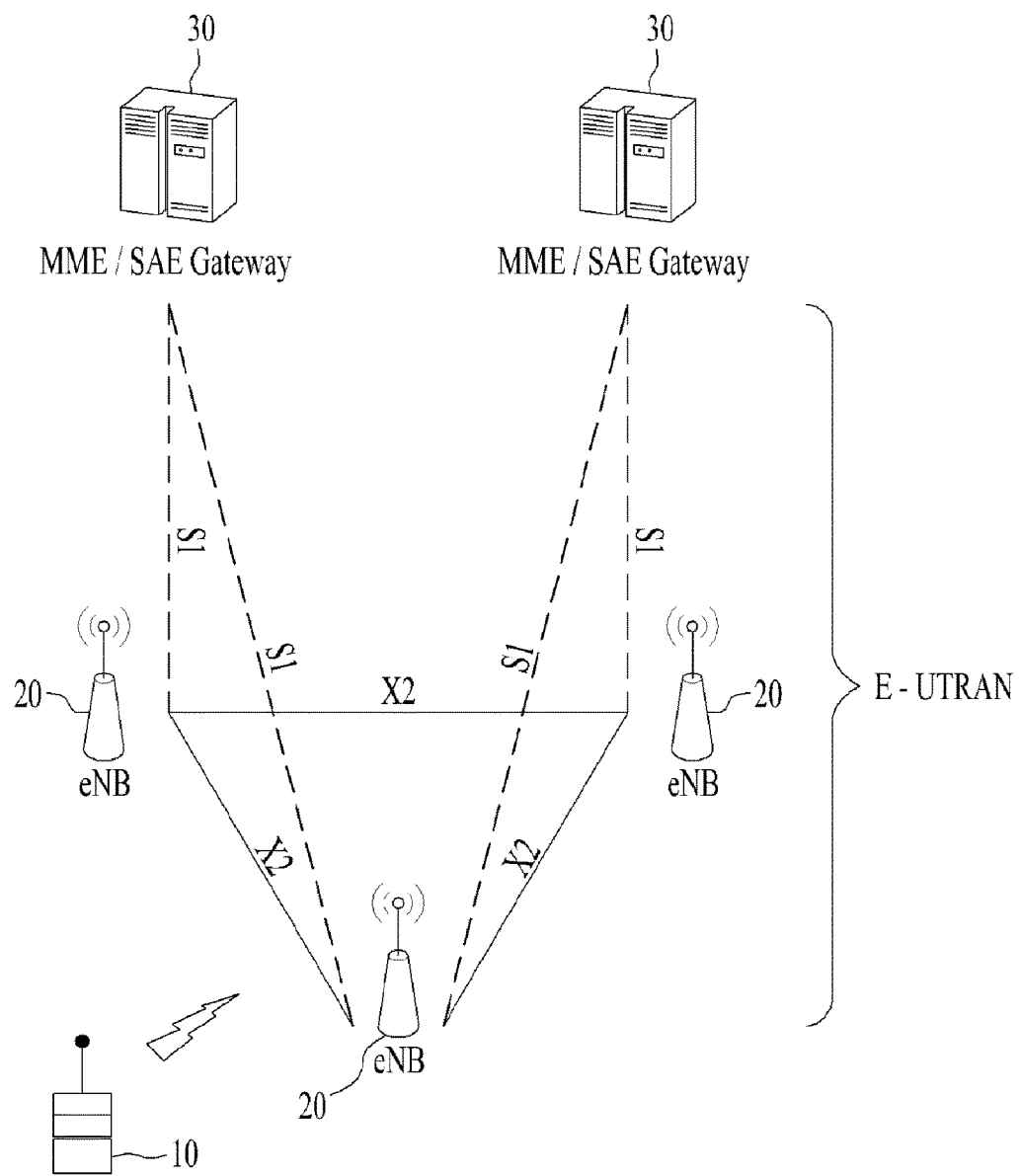

[Fig. 2b]
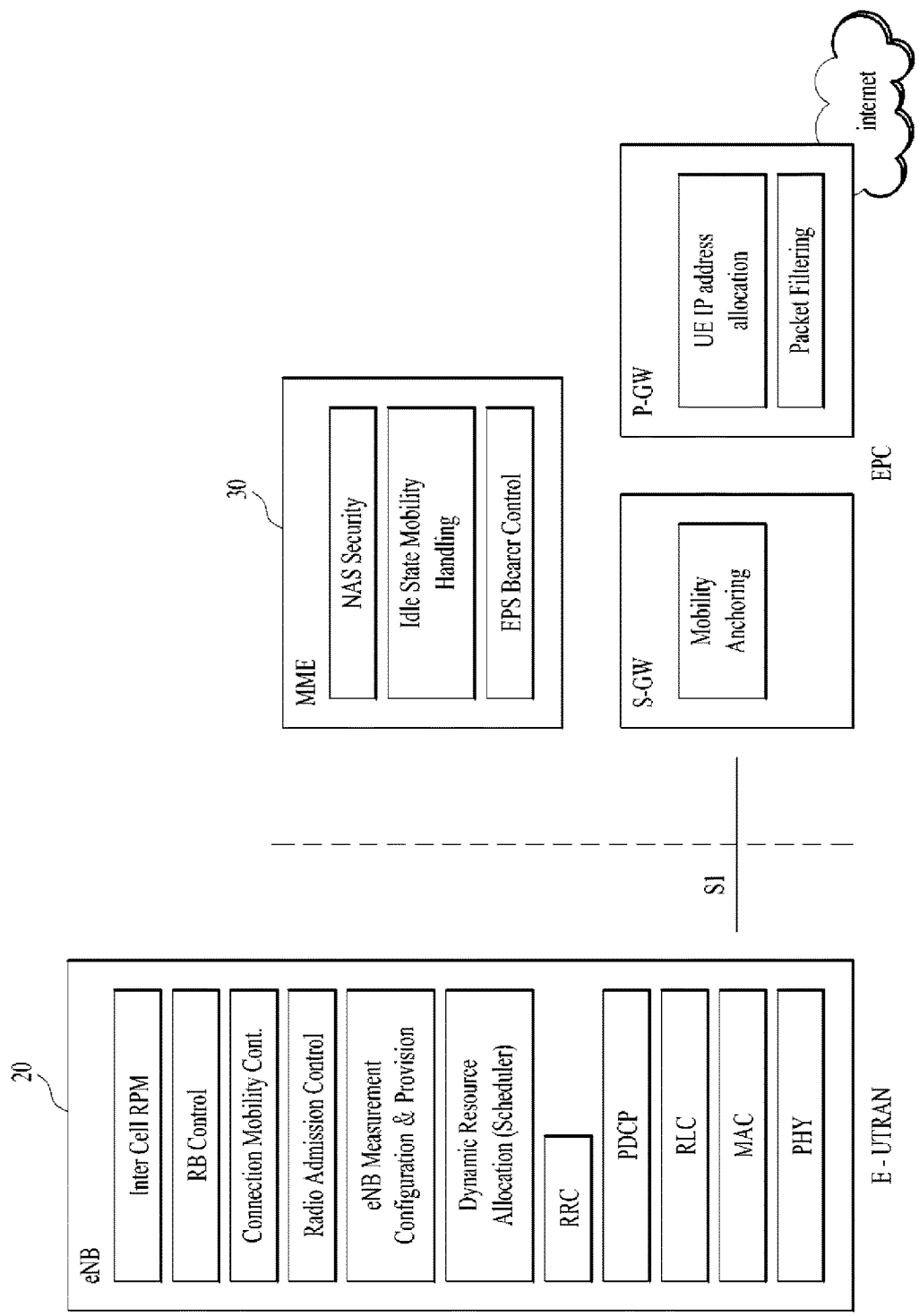

[Fig. 3]
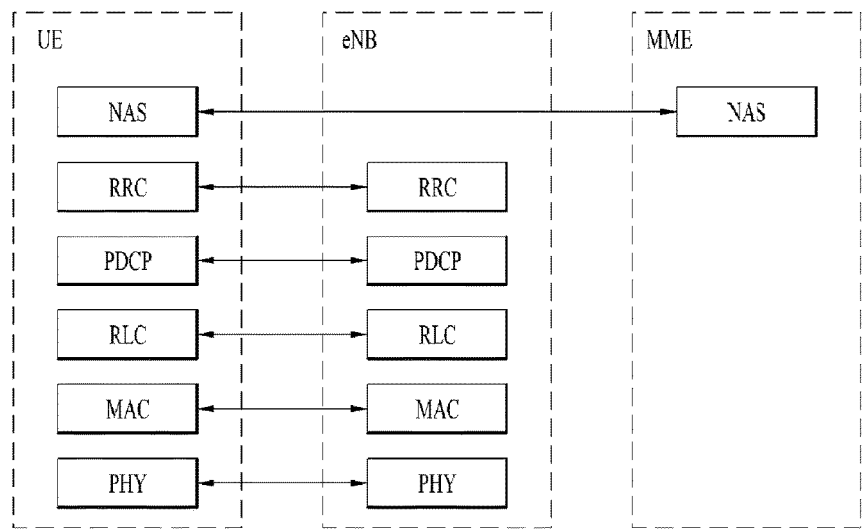
(a) Control-Plane Protocol Stack
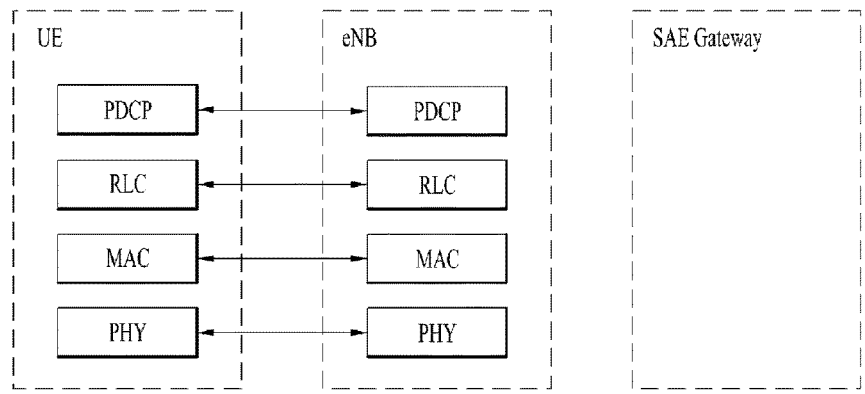
(b) User-Plane Protocol Stack
[Fig. 4]
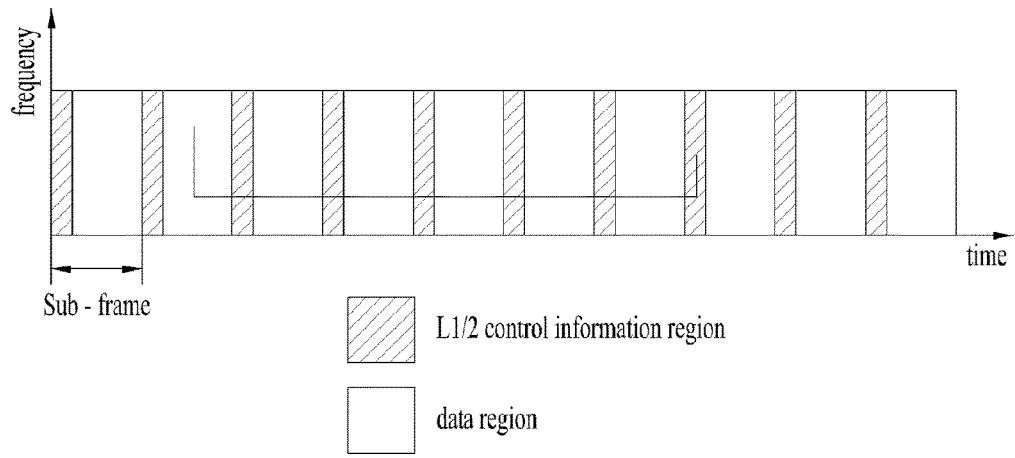

[Fig. 5]
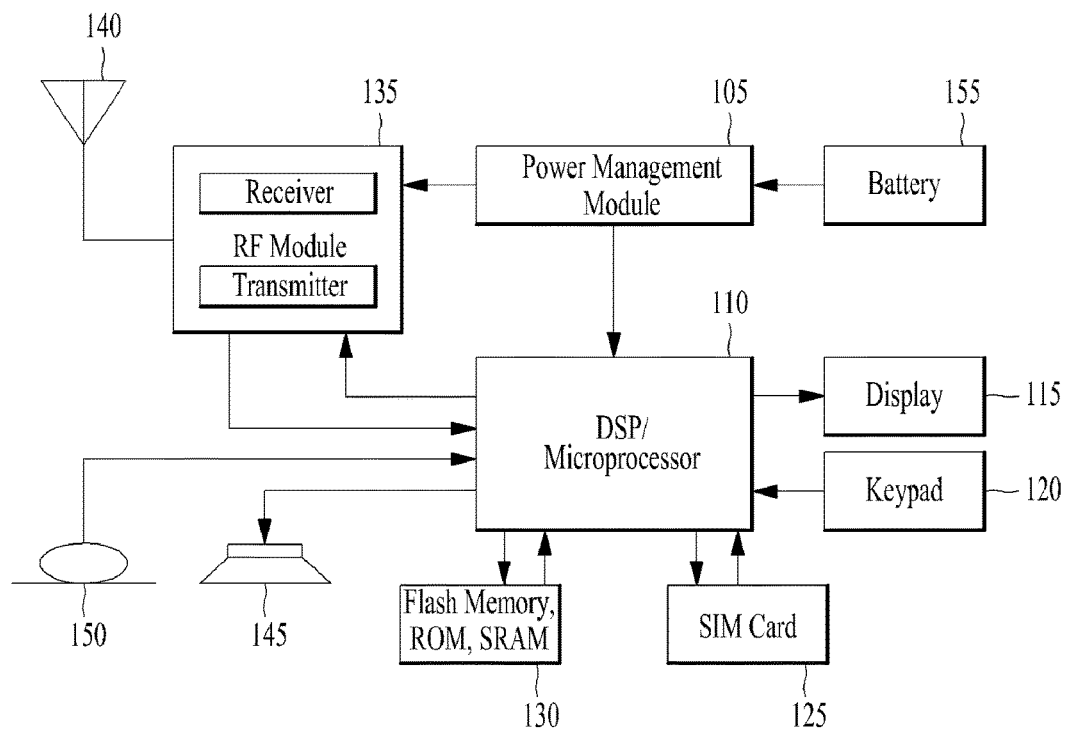
[Fig. 6]
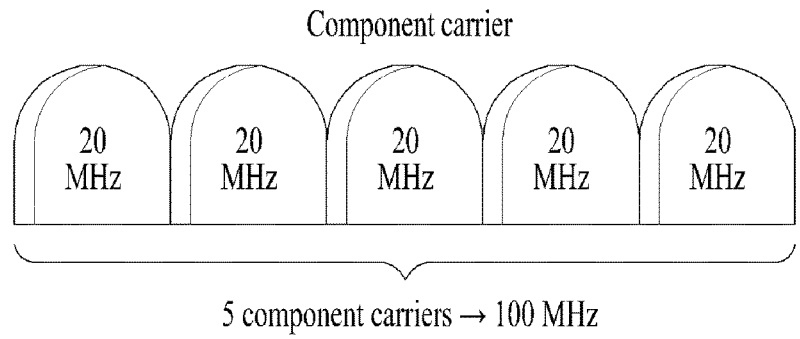

[Fig. 7]
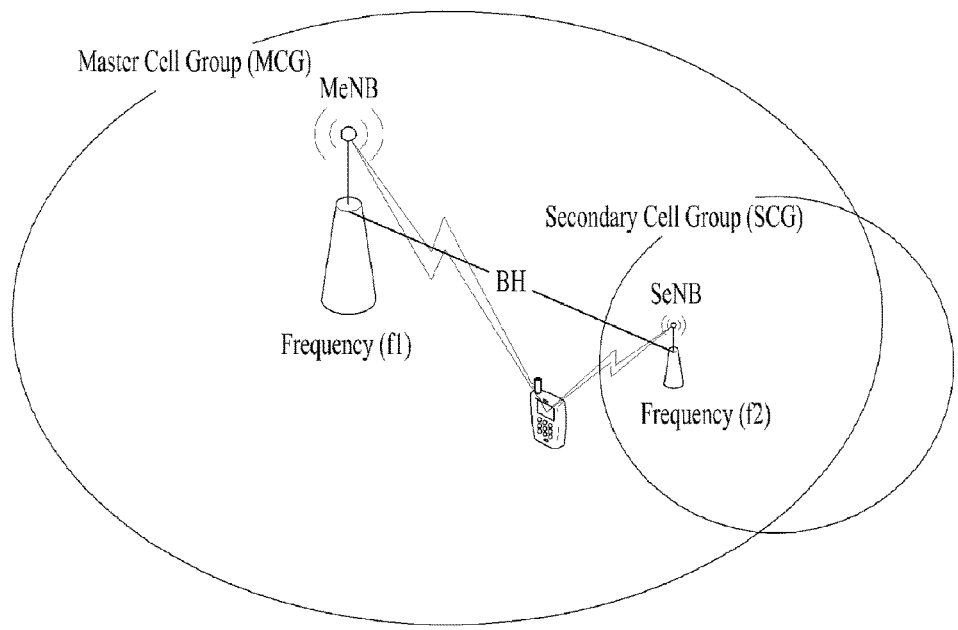
[Fig. 8]
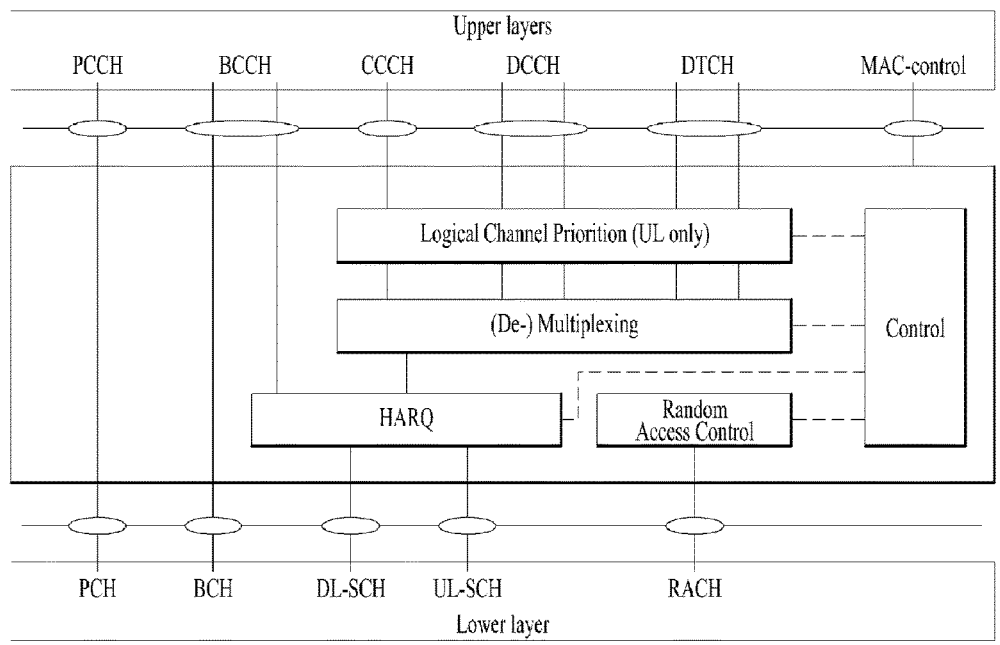

[Fig. 9]
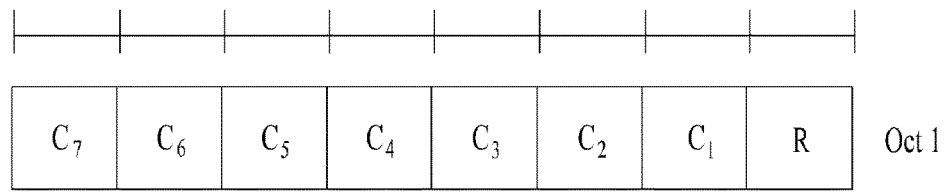
[Fig. 10]
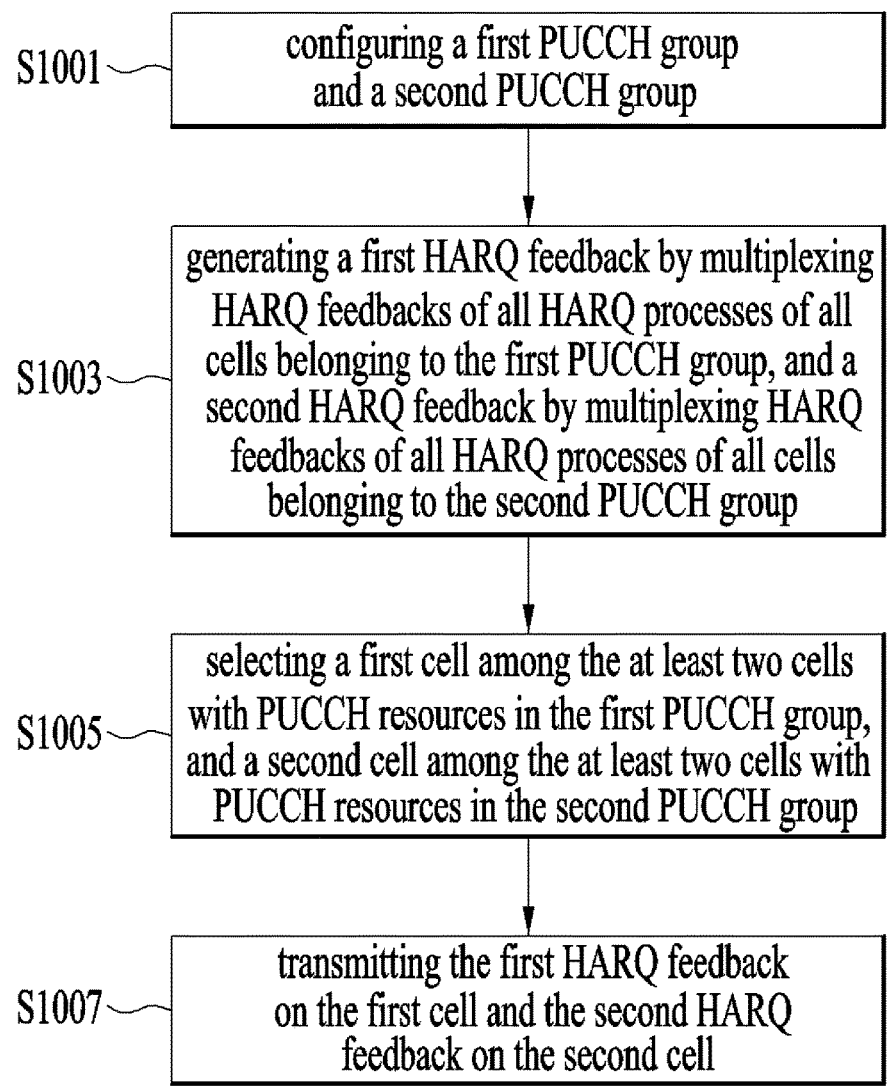

[Fig. 11]
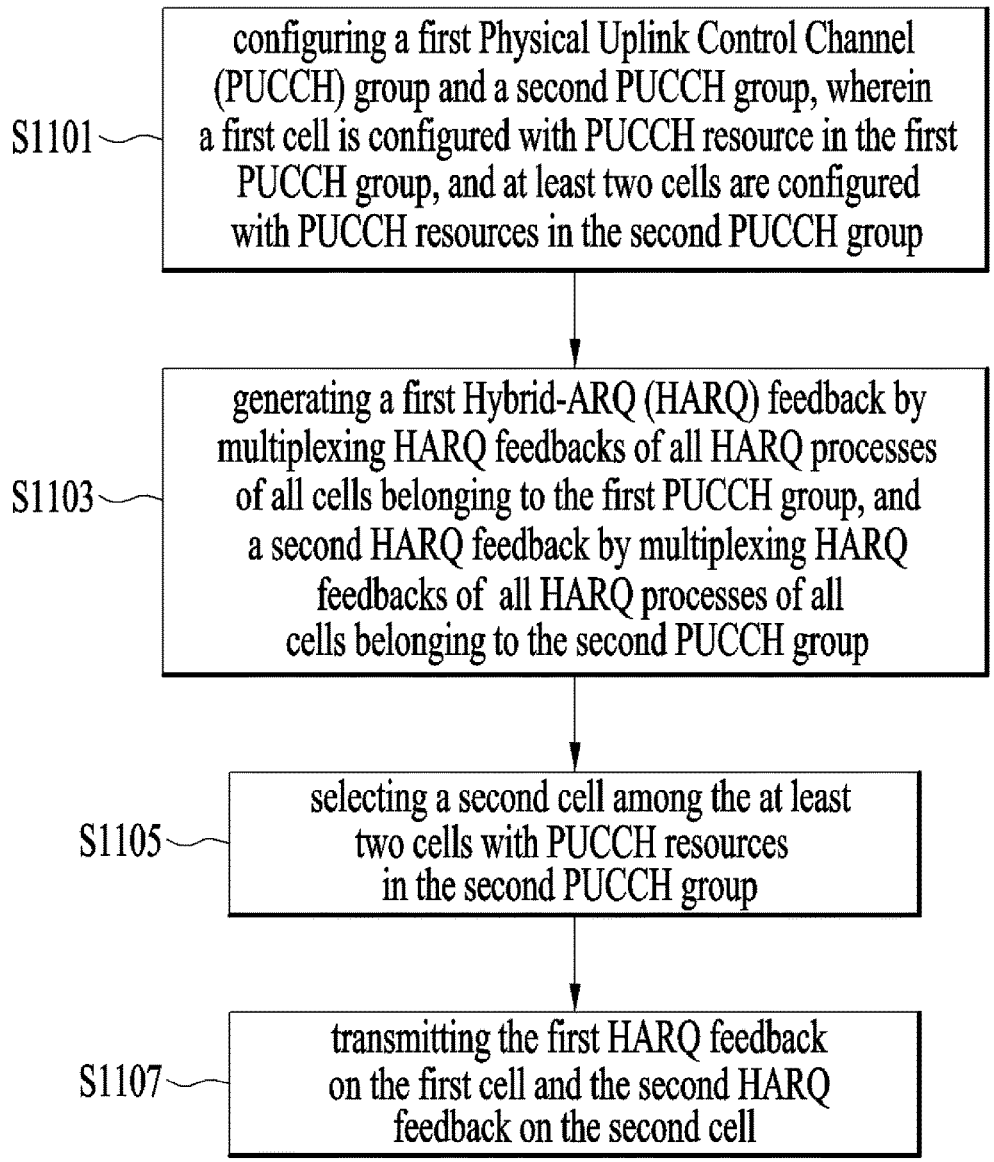
[Fig. 12a]
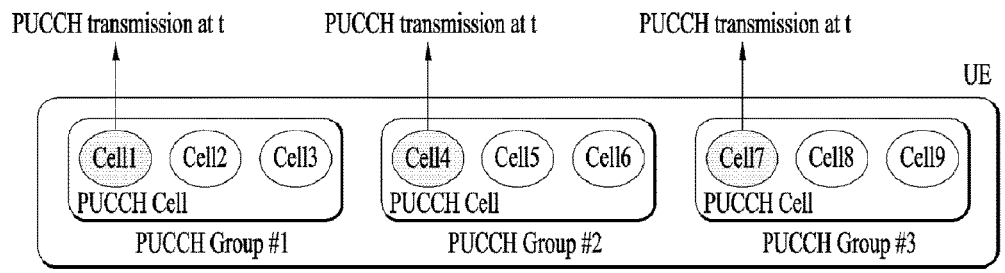

[Fig. 12b]
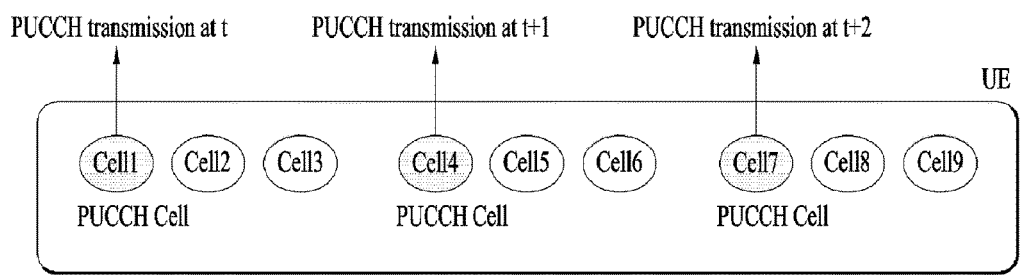

METHOD FOR TRANSMITTING MULTIPLEXED HARQ FEEDBACKS IN A CARRIER AGGREGATION SYSTEM AND A DEVICE THEREFOR

CROSS REFERENCE TO RELATED APPLICATIONS

This application is the National Phase of PCT International Application No. PCT/KR2016/000356, filed on Jan. 13, 2016, which claims priority under 35 U.S.C. 119(e) to U.S. Provisional Application No. 62/103,576, filed on Jan. 15, 2015, all of which are hereby expressly incorporated by reference into the present application.

TECHNICAL FIELD

The present invention relates to a wireless communication system and, more particularly, to a method for transmitting multiplexed HARQ feedbacks in a carrier aggregation system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for transmitting multiplexed HARQ feedbacks in a carrier aggregation system. The technical problems solved by the present invention are not limited to the above technical problems and those skilled in the art may understand other technical problems from the following description.

Solution to Problem

The object of the present invention can be achieved by providing a method for a UE operating in a wireless communication system, the method comprising: configuring a first Physical Uplink Control Channel (PUCCH) group and a second PUCCH group, wherein at least two cells are configured with PUCCH resources in each of the first PUCCH group and the second PUCCH group; generating a first Hybrid-ARQ (HARQ) feedback by multiplexing HARQ feedbacks of all HARQ processes of all cells belonging to the first PUCCH group; generating a second HARQ feedback by multiplexing HARQ feedbacks of all HARQ processes of all cells belonging to the second PUCCH group; selecting a first cell among the at least two cells with PUCCH resources in the first PUCCH group; selecting a second cell among the at least two cells with PUCCH resources in the second PUCCH group; and transmitting the first HARQ feedback on the first cell and the second HARQ feedback on the second cell.

Preferably, wherein when the UE multiplexes the HARQ feedbacks of all HARQ processes of all cells belonging to the first PUCCH group, the UE considers HARQ feedback of a HARQ process of a cell belonging to the first PUCCH Group as ACK (Acknowlegdement) if the HARQ process successfully decodes a received TB (Transport Block), and the UE considers HARQ feedback of a HARQ process of a cell belonging to the first PUCCH group as NACK (Negative-Acknowledgement) if the HARQ process is allocated to a deactivated cell, or a HARQ process has not received any TB, or a HARQ process fails in decoding the received TB, and when the UE multiplexes the HARQ feedbacks of all HARQ processes of all cells belonging to the second PUCCH group, the UE considers HARQ feedback of a HARQ process of a cell belonging to the second PUCCH group as ACK if the HARQ process successfully decodes a received TB, and the UE considers HARQ feedback of a HARQ process of a cell belonging to the second PUCCH group as NACK if the HARQ process is allocated to a deactivated cell, or a HARQ process has not received any TB, or a HARQ process fails in decoding the received TB.

Preferably, when the UE selects the first cell among the at least two cells with PUCCH resources in the first PUCCH group, the UE randomly selects the first cell with equal probability in the first PUCCH group, or the UE selects the first cell which has a highest priority in the first PUCCH group, or the UE selects the first cell which a best downlink cell channel quality in the first PUCCH group, or the UE selects the first cell having a highest or the lowest cell index in the first PUCCH group.

Preferably, wherein when the UE selects the second cell among the at least two cells with PUCCH resources in the second PUCCH group, the UE randomly selects the second cell with equal probability in the second PUCCH group, or the UE selects the second cell which has a highest priority in the second PUCCH group, or the UE selects the second cell which a best downlink cell channel quality in the second PUCCH group, or the UE selects the second cell having a highest or the lowest cell index in the second PUCCH group.

Preferably, wherein the first cell and the second cell are not PCells, or the first cell is not a cell with worst channel quality in the first PUCCH group, and the second cell is not a cell with worst channel quality in the second PUCCH group, or the first cell and the second cell are not cells having channel quality being less than a threshold.

Preferably, when the UE configures a cell with PUCCH resource in one of the first PUCCH group and the second PUCCH group, the UE receives the PUCCH resource with which the UE configures the cell or, an indication indicating which PUCCH group to which the cell belongs.

Preferably, when the UE configures a cell without PUCCH resource in one of the first PUCCH group and the second PUCCH group, the UE receives an indication indicating which PUCCH group to which the cell belongs.

In another aspect of the present invention can be achieved by providing a method for a UE operating in a wireless communication system, the method comprising: configuring a first Physical Uplink Control Channel (PUCCH) group and a second PUCCH group, wherein a first cell is configured with PUCCH resource in the first PUCCH group, and at least two cells are configured with PUCCH resources in the second PUCCH group; generating a first Hybrid-ARQ (HARQ) feedback by multiplexing HARQ feedbacks of all HARQ processes of all cells belonging to the first PUCCH group; generating a second HARQ feedback by multiplexing HARQ feedbacks of all HARQ processes of all cells belonging to the second PUCCH group; selecting a second cell among the at least two cells with PUCCH resources in the second PUCCH group; and transmitting the first HARQ feedback on the first cell and the second HARQ feedback on the second cell.

Preferably, wherein when the UE multiplexes the HARQ feedbacks of all HARQ processes of all cells belonging to the first PUCCH group, the UE considers HARQ feedback of a HARQ process of a cell belonging to the first PUCCH Group as ACK (Acknowlegdement) if the HARQ process successfully decodes a received TB (Transport Block), and the UE considers HARQ feedback of a HARQ process of a cell belonging to the first PUCCH group as NACK (Negative-Acknowledgement) if the HARQ process is allocated to a deactivated cell, or a HARQ process has not received any TB, or a HARQ process fails in decoding the received TB, and when the UE multiplexes the HARQ feedbacks of all HARQ processes of all cells belonging to the second PUCCH group, the UE considers HARQ feedback of a HARQ process of a cell belonging to the second PUCCH group as ACK if the HARQ process successfully decodes a received TB, and the UE considers HARQ feedback of a HARQ process of a cell belonging to the second PUCCH group as NACK if the HARQ process is allocated to a deactivated cell, or a HARQ process has not received any TB, or a HARQ process fails in decoding the received TB.

Preferably, when the UE selects the second cell among the at least two cells with PUCCH resources in the second PUCCH group, the UE randomly selects the second cell with equal probability in the second PUCCH group, or the UE selects the second cell which has a highest priority in the second PUCCH group, or the UE selects the second cell which a best downlink cell channel quality in the second PUCCH group, or the UE selects the second cell having a highest or the lowest cell index in the second PUCCH group.

Preferably, before the UE selects the second cell which has a highest priority, the UE receives the priority of the at least two cell with the PUCCH resources by receiving a Physical layer (PHY), Medium Access Control (MAC), or Radio Resource Control (RRC) signaling from a network.

Preferably, the second cell are not PCells, or the second cell is not a cell with worst channel quality in the second PUCCH group, or the second cell are not cells having channel quality being less than a threshold.

Preferably, when the UE configures a cell with PUCCH resource in one of the second PUCCH group, the UE receives the PUCCH resource with which the UE configures the cell or, an indication indicating which PUCCH group to which the cell belongs.

Preferably, when the UE configures a cell without PUCCH resource in one of the second PUCCH group, the UE receives an indication indicating which PUCCH group to which the cell belongs.

It is to be understood that both the foregoing general description and the following detailed description of the present invention are exemplary and explanatory and are intended to provide further explanation of the invention as claimed.

Advantageous Effects of Invention

According to the present invention, transmitting multiplexed HARQ feedbacks can be efficiently performed in a carrier aggregation system. Specifically, when a UE is configured with multiple PUCCH cells per PUCCH Group, the UE generates a multiplexed HARQ feedback by multiplexing HARQ feedbacks of all HARQ processes of all configured cells belonging to the PUCCH Group, selects one PUCCH cell among the multiple PUCCH cells belonging to the PUCCH Group, and transmits the multiplexed HARQ feedback on the selected PUCCH cell of the PUCCH Group.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2a is a block diagram illustrating network structure of an evolved universal mobile telecommunication system (E-UMTS), and FIG. 2b is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is a diagram for carrier aggregation;

FIG. 7 is a conceptual diagram for Dual Connectivity (DC) between a Master Cell Group (MCS) and a Secondary Cell Group (SCG);

FIG. 8 is a diagram for MAC structure overview in a UE side;

FIG. 9 is a diagram for an activation/deactivation MAC control element; and

FIGS. 10 and 11 are conceptual diagrams for transmitting multiplexed HARQ feedbacks in a carrier aggregation system according to embodiments of the present invention; and FIGS. 12a and 12b are examples for transmitting multiplexed HARQ feedbacks in a carrier aggregation system according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PD-CCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals).

FIG. 6 is a diagram for carrier aggregation.

Carrier Aggregation (CA) technology for supporting multiple carriers is described with reference to FIG. 6 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on noncontiguous frequency bands may be used for carrier aggregation as well. In the carrier aggregation technology, bandwidth sizes of uplink and downlink may be allocated symmetrically or asymmetrically.

When CA is configured, the UE only has one RRC connection with the network. At RRC connection establishment/re-establishment/handover, one serving cell provides the NAS mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The configured set of serving cells for a UE therefore always consists of one PCell and one or more SCells:

For each SCell the usage of uplink resources by the UE in addition to the downlink ones is configurable (the number of DL SCCs configured is therefore always larger than or equal to the number of UL SCCs and no SCell can be configured for usage of uplink resources only);

From a UE viewpoint, each uplink resource only belongs to one serving cell;

The number of serving cells that can be configured depends on the aggregation capability of the UE;

PCell can only be changed with handover procedure (i.e. with security key change and RACH procedure);

PCell is used for transmission of PUCCH;

Unlike SCells, PCell cannot be de-activated;

Re-establishment is triggered when PCell experiences RLF, not when SCells experience RLF;

NAS information is taken from PCell.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

The reconfiguration, addition and removal of SCells can be performed by RRC. At intra-LTE handover, RRC can also add, remove, or reconfigure SCells for usage with the target PCell. When adding a new SCell, dedicated RRC signalling is used for sending all required system information of the SCell i.e. while in connected mode, UEs need not acquire broadcasted system information directly from the SCells.

FIG. 7 is a conceptual diagram for Dual Connectivity (DC) between a Master Cell Group (MCS) and a Secondary Cell Group (SCG).

The Dual Connectivity (DC) means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

The Dual Connectivity is a kind of carrier aggregation in that the UE is configured a plurality serving cells. However, unlike all serving cells supporting carrier aggregation of FIG. 6 are served by a same eNB, all serving cells supporting dual connectivity of FIG. 7 are served by different eNBs, respectively at same time. The different eNBs are connected via non-ideal backhaul interface because the UE is connected with the different eNBs at same time.

With Dual Connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

For SCG, the following principles are applied:

At least one cell in SCG has a configured UL CC and one of them, named PSCell, is configured with PUCCH resources;

When SCG is configured, there is always at least one SCG bearer or one Split bearer;

Upon detection of a physical layer problem or a random access problem on PSCell, or the maximum number of RLC retransmissions has been reached associated with the SCG, or upon detection of an access problem on PSCell (T307 expiry) during SCG addition or SCG change:

RRC connection Re-establishment procedure is not triggered;

All UL transmissions towards all cells of the SCG are stopped;

MeNB is informed by the UE of SCG failure type.

For split bearer, the DL data transfer over the MeNB is maintained.

Only the RLC AM bearer can be configured for the split bearer;

Like PCell, PSCell cannot be de-activated;

PSCell can only be changed with SCG change (i.e. with security key change and RACH procedure);

Neither direct bearer type change between Split bearer and SCG bearer nor simultaneous configuration of SCG and Split bearer are supported.

With respect to the interaction between MeNB and SeNB, the following principles are applied:

The MeNB maintains the RRM measurement configuration of the UE and may, e.g, based on received measurement reports or traffic conditions or bearer types, decide to ask a SeNB to provide additional resources (serving cells) for a UE.

Upon receiving the request from the MeNB, a SeNB may create the container that will result in the configuration of additional serving cells for the UE (or decide that it has no resource available to do so).

For UE capability coordination, the MeNB provides (part of) the AS configuration and the UE capabilities to the SeNB.

The MeNB and the SeNB exchange information about UE configuration by means of RRC containers (inter-node messages) carried in X2 messages.

The SeNB may initiate a reconfiguration of its existing serving cells (e.g., PUCCH towards the SeNB).

The SeNB decides which cell is the PSCell within the SCG.

The MeNB does not change the content of the RRC configuration provided by the SeNB.

In the case of the SCG addition and SCG SCell addition, the MeNB may provide the latest measurement results for the SCG cell(s).

Both MeNB and SeNB know the SFN and subframe offset of each other by OAM, e.g., for the purpose of DRX alignment and identification of measurement gap.

When adding a new SCG SCell, dedicated RRC signalling is used for sending all required system information of the cell as for CA described above, except for the SFN acquired from MIB of the PSCell of SCG.

FIG. 8 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical-channel types specified for LTE includes:

The Broadcast Control Channel (BCCH), used for transmission of system information from the network to all terminals in a cell. Prior to accessing the system, a terminal needs to acquire the system information to find out how the system is configured and, in general, how to behave properly within a cell.

The Paging Control Channel (PCCH), used for paging of terminals whose location on a cell level is not known to the network. The paging message therefore needs to be transmitted in multiple cells.

The Common Control Channel (CCCH), used for transmission of control information in conjunction with random access.

The Dedicated Control Channel (DCCH), used for transmission of control information to/from a terminal. This channel is used for individual configuration of terminals such as different handover messages.

The Multicast Control Channel (MCCH), used for transmission of control information required for reception of the MTCH.

The Dedicated Traffic Channel (DTCH), used for transmission of user data to/from a terminal. This is the logical channel type used for transmission of all uplink and non-MBSFN downlink user data.

The Multicast Traffic Channel (MTCH), used for downlink transmission of MBMS services.

From the physical layer, the MAC layer uses services in the form of transport channels. A transport channel is defined by how and with what characteristics the information is transmitted over the radio interface. Data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (MIMO), there can be up to two transport blocks per TTI.

Associated with each transport block is a Transport Format (TF), specifying how the transport block is to be transmitted over the radio interface. The transport format includes information about the transport-block size, the modulation-and-coding scheme, and the antenna mapping. By varying the transport format, the MAC layer can thus realize different data rates. Rate control is therefore also known as transport-format selection.

The following transport-channel types are defined for LTE:

The Broadcast Channel (BCH) has a fixed transport format, provided by the specifications. It is used for transmission of parts of the BCCH system information, more specifically the so-called Master Information Block (MIB).

The Paging Channel (PCH) is used for transmission of paging information from the PCCH logical channel. The PCH supports discontinuous reception (DRX) to allow the terminal to save battery power by waking up to receive the PCH only at predefined time instants. The Downlink Shared Channel (DL-SCH) is the main transport channel used for transmission of downlink data in LTE. It supports key LTE features such as dynamic rate adaptation and channel-dependent scheduling in the time and frequency domains, hybrid ARQ with soft combining, and spatial multiplexing. It also supports DRX to reduce terminal power consumption while still providing an always-on experience. The DL-SCH is also used for transmission of the parts of the BCCH system information not mapped to the BCH. There can be multiple DL-SCHs in a cell, one per terminal scheduled in this TTI, and, in some subframes, one DL-SCH carrying system information.

The Multicast Channel (MCH) is used to support MBMS. It is characterized by a semi-static transport format and semi-static scheduling. In the case of multi-cell transmission using MBSFN, the scheduling and transport format configuration is coordinated among the transmission points involved in the MBSFN transmission.

The Uplink Shared Channel (UL-SCH) is the uplink counterpart to the DL-SCH? that is, the uplink transport channel used for transmission of uplink data.

In addition, the Random-Access Channel (RACH) is also defined as a transport channel, although it does not carry transport blocks.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling? for example, timing-advance commands and random-access response. Control elements are identified with reserved values in the LCID field, where the LCID value indicates the type of control information.

Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

In Dual Connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively. A Timing Advance Group containing the SpCell of a MAC entity is referred to as pTAG, whereas the term sTAG refers to other TAGs.

If a reset of the MAC entity is requested by upper layers, the MAC entity shall:
  initialize Bj for each logical channel to zero;
  stop (if running) all timers;
  consider all timeAlignmentTimers as expired;
  set the NDIs for all uplink HARQ processes to the value 0;
  stop, if any, ongoing RACH procedure;
  discard explicitly signalled ra-PreambleIndex and ra-PRACH-MaskIndex, if any;
  flush Msg3 buffer;
  cancel, if any, triggered Scheduling Request procedure;
  cancel, if any, triggered Buffer Status Reporting procedure;
  cancel, if any, triggered Power Headroom Reporting procedure;
  flush the soft buffers for all DL HARQ processes;
  for each DL HARQ process, consider the next received transmission for a TB as the very first transmission;
  release, if any, Temporary C-RNTI.

FIG. 9 is a diagram for an activation/deactivation MAC control element.

If the UE is configured with one or more SCells, the network may activate and deactivate the configured SCells. The PCell is always activated. The network activates and deactivates the SCell(s) by sending the Activation/Deactivation MAC control element. Furthermore, the UE maintains a sCellDeactivationTimer timer per configured SCell and deactivates the associated SCell upon its expiry. The same initial timer value applies to each instance of the sCellDeactivationTimer and it is configured by RRC. The configured SCells are initially deactivated upon addition and after a handover.

The UE configures each SCell to each TTI and for each configured SCell:
  If the UE receives an Activation/Deactivation MAC control element in this TTI activating the SCell, the UE may activate the SCell in the TTI. The UE can apply normal SCell operation including i) SRS transmissions on the SCell, ii) CQI/PMI/RI/PTI reporting for the SCell, iii) PDCCH monitoring on the SCell, or iv) PDCCH monitoring for the SCell. Also the UE may start or restart the sCellDeactivationTimer associated with the SCell and trigger PHR.

If the UE receives an Activation/Deactivation MAC control element in this TTI deactivating the SCell, or if the sCellDeactivationTimer associated with the activated SCell expires in this TTI, the UE can deactivate the SCell in the TTI, stop the sCellDeactivationTimer associated with the SCell, and flush all HARQ buffers associated with the SCell.

If PDCCH on the activated SCell indicates an uplink grant or downlink assignment; or if PDCCH on the Serving Cell scheduling the activated SCell indicates an uplink grant or a downlink assignment for the activated SCell, the UE can restart the sCellDeactivationTimer associated with the SCell.

If the SCell is deactivated, the UE will not transmit SRS on the SCell, transmit on UL-SCH on the SCell, transmit on RACH on the SCell, monitor the PDCCH on the SCell, or monitor the PDCCH for the SCell.

HARQ feedback for the MAC PDU containing Activation/Deactivation MAC control element may not be impacted by PCell interruption due to SCell activation/deactivation.

The Activation/Deactivation MAC control element is identified by a MAC PDU subheader with LCID as specified in table 1. It has a fixed size and consists of a single octet containing seven C-fields and one R-field. The Activation/Deactivation MAC control element is defined as FIG. 9.

TABLE 1

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Ci field indicates the activation/deactivation status of the SCell with SCellIndex i, if there is an SCell configured with SCellIndex i. Else, the UE may ignore the Ci field. The Ci field is set to "1" to indicate that the SCell with SCellIndex i shall be activated. The Ci field is set to "0" to indicate that the SCell with SCellIndex i shall be de-activated. R field is a reserved bit, and set to '0'.

The sCellDeactivationTimer is a SCell deactivation timer. Value in number of radio frames. Value rf4 corresponds to 4 radio frames, value rf8 corresponds to 8 radio frames and so on. E-UTRAN only configures the field if the UE is configured with one or more SCells other than the PSCell. If the field is absent, the UE shall delete any existing value for this field and assume the value to be set to infinity. The same value applies for each SCell of a Cell Group (i.e. MCG or SCG) (although the associated functionality is performed independently for each SCell).

Up to Rel-12, only one cell in a Cell Group can be configured with PUCCH resource, i.e., the special cell in CA/DC, which is always activated. In Rel-13, cells other the special cell could be configured with PUCCH resource in order to offload the PUCCH traffic from the special cell to other cells.

In the legacy, as there is one cell configured with PUCCH resource, there is only one PUCCH resource in a given TTI and the UE transmits HARQ feedback on that PUCCH resource by gathering ACK and NACK feedbacks of all configured cells. Note that for the cell in Deactivated state, the UE considers the feedback as NACK.

In Rel-13, if the network wants to configure multiple PUCCH resources for a UE, a new mechanism is required in consideration of the following aspects: i) How to configure multiple PUCCH resources for a UE, ii) How to multiplex HARQ feedbacks of the cells configured for the UE, and iii) How to transmit the HARQ feedback to the network.

FIG. 10 is a conceptual diagram for transmitting multiplexed HARQ feedbacks in a carrier aggregation system according to embodiments of the present invention.

In this invention, a UE is configured with multiple PUCCH cells per PUCCH Group. The UE generates a multiplexed HARQ feedback by multiplexing HARQ feedbacks of all HARQ processes of all configured cells belonging to the PUCCH Group, selects one PUCCH cell among the multiple PUCCH cells belonging to the PUCCH Group, and transmits the multiplexed HARQ feedback on the selected PUCCH cell of the PUCCH Group.

FIG. 10 represents that the UE configures multiple PUCCH groups and multiple PUCCH cells in each PUCCH group. Preferably, PUCCH cell refers to a cell configured with PUCCH resource and non-PUCCH cell refers to a cell not configured with PUCCH resource.

The UE configures a first PUCCH group and a second PUCCH group, wherein at least two cells are configured with PUCCH resources in each of the first PUCCH group and the second PUCCH group (S1001).

Preferably, the PUCCH Group includes one or more PUCCH cell and zero or more non-PUCCH cell. The PUCCH Group can be indicated in a various way; e.g. Timing Advance Group (TAG), Cell Group (CG), etc.

In a TTI where the HARQ feedback needs to be transmitted for at least one HARQ process of a cell, the UE generates a multiplexed HARQ feedback by multiplexing HARQ feedback of all HARQ processes of all cells belonging to the PUCCH Group.

The UE generates a first HARQ feedback by multiplexing HARQ feedbacks of all HARQ processes of all cells belonging to the first PUCCH group, and generates a second HARQ feedback by multiplexing HARQ feedbacks of all HARQ processes of all cells belonging to the second PUCCH group (S1003).

Preferably, wherein when the UE multiplexes the HARQ feedbacks of all HARQ processes of all cells belonging to the first PUCCH group, the UE considers HARQ feedback of a HARQ process of a cell belonging to the first PUCCH Group as ACK (Acknowlegdement) if the HARQ process successfully decodes a received TB (Transport Block), and the UE considers HARQ feedback of a HARQ process of a cell belonging to the first PUCCH group as NACK (Negative-Acknowledgement) if the HARQ process is allocated to a deactivated cell, or a HARQ process has not received any TB, or a HARQ process fails in decoding the received TB, and when the UE multiplexes the HARQ feedbacks of all HARQ processes of all cells belonging to the second PUCCH group, the UE considers HARQ feedback of a HARQ process of a cell belonging to the second PUCCH group as ACK if the HARQ process successfully decodes a received TB, and the UE considers HARQ feedback of a HARQ process of a cell belonging to the second PUCCH group as NACK if the HARQ process is allocated to a deactivated cell, or a HARQ process has not received any TB, or a HARQ process fails in decoding the received TB.

When the UE transmits the multiplexed HARQ feedback, the UE selects one PUCCH cell among the multiple PUCCH cells belonging to the PUCCH Group to transmit the multiplexed HARQ feedback (S1005).

The UE selects a first cell among the at least two cells with PUCCH resources in the first PUCCH group, and selects a second cell among the at least two cells with PUCCH resources in the second PUCCH group.

Preferably, when the UE selects the first cell among the at least two cells with PUCCH resources in the first PUCCH group, the UE randomly selects the first cell with equal probability in the first PUCCH group, or the UE selects the first cell which has a highest priority in the first PUCCH group, or the UE selects the first cell which a best downlink cell channel quality in the first PUCCH group (e.g., RSRP, RSRQ), or the UE selects the first cell having a highest or the lowest cell index in the first PUCCH group.

And when the UE selects the second cell among the at least two cells with PUCCH resources in the second PUCCH group, the UE randomly selects the second cell with equal probability in the second PUCCH group, or the UE selects the second cell which has a highest priority in the second PUCCH group, or the UE selects the second cell which a best downlink cell channel quality in the second PUCCH group (e.g., RSRP, RSRQ), or the UE selects the second cell having a highest or the lowest cell index in the second PUCCH group.

Indeed, before the UE selects the first cell and the second cell which has a highest priority, the UE receives the priority of the at least two cell with the PUCCH resources by receiving a Physical layer (PHY), Medium Access Control (MAC), or Radio Resource Control (RRC) signaling from a network.

When the UE selects one PUCCH cell, the UE may exclude the following cell from the selection: i) the special cell, i.e. PCell or PSCell, ii) the PUCCH cell with worst channel quality, e.g., RSRP, RSRQ, iii) the PUCCH cells whose channel quality, e.g., RSRP, RSRQ, are below a threshold. In this case, the network can inform the UE of the threshold by a PHY/MAC/RRC signaling.

In other word, the first cell and the second cell are not PCells, or the first cell is not a cell with worst channel quality in the first PUCCH group, and the second cell is not a cell with worst channel quality in the second PUCCH group, or the first cell and the second cell are not cells having channel quality being less than a threshold.

The UE transmits the first HARQ feedback on the first cell and the second HARQ feedback on the second cell (S1007).

In addition, the network configures a PUCCH cell to a UE by control signaling including following information: i) PUCCH resource, or ii) an indication of PUCCH Group to which the PUCCH cell belongs.

Thus, when the UE configures a cell with PUCCH resource in one of the first PUCCH group and the second PUCCH group, the UE receives the PUCCH resource with which the UE configures the cell or, an indication indicating which PUCCH group to which the cell belongs.

And also the network configures a non-PUCCH cell to a UE by control signaling including following information: an indication of PUCCH Group to which the non-PUCCH cell belongs.

Thus, when the UE configures a cell without PUCCH resource in one of the first PUCCH group and the second PUCCH group, the UE receives an indication indicating which PUCCH group to which the cell belongs.

FIG. 11 is a conceptual diagram for transmitting multiplexed HARQ feedbacks in a carrier aggregation system according to embodiments of the present invention.

FIG. 11 represents that the UE configures multiple PUCCH groups, one PUCCH cell in a one PUCCH group and multiple PUCCH cells in another PUCCH group. Preferably, PUCCH cell refers to a cell configured with PUCCH resource and non-PUCCH cell refers to a cell not configured with PUCCH resource.

The UE configures a first PUCCH group and a second PUCCH group, wherein a first cell is configured with PUCCH resource in the first PUCCH group, and at least two cells are configured with PUCCH resources in the second PUCCH group (S1101).

Preferably, the PUCCH Group includes one or more PUCCH cell and zero or more non-PUCCH cell. The PUCCH Group can be indicated in a various way; e.g. Timing Advance Group (TAG), Cell Group (CG), etc.

In a TTI where the HARQ feedback needs to be transmitted for at least one HARQ process of a cell, the UE generates a multiplexed HARQ feedback by multiplexing HARQ feedback of all HARQ processes of all cells belonging to the PUCCH Group.

The UE generates a first HARQ feedback by multiplexing HARQ feedbacks of all HARQ processes of all cells belonging to the first PUCCH group, and generates a second HARQ feedback by multiplexing HARQ feedbacks of all HARQ processes of all cells belonging to the second PUCCH group (S1103).

Preferably, when the UE multiplexes the HARQ feedbacks of all HARQ processes of all cells belonging to the first PUCCH group, the UE considers HARQ feedback of a HARQ process of a cell belonging to the first PUCCH Group as ACK (Acknowlegdement) if the HARQ process successfully decodes a received TB (Transport Block), and the UE considers HARQ feedback of a HARQ process of a cell belonging to the first PUCCH group as NACK (Negative-Acknowledgement) if the HARQ process is allocated to a deactivated cell, or a HARQ process has not received any TB, or a HARQ process fails in decoding the received TB, and when the UE multiplexes the HARQ feedbacks of all HARQ processes of all cells belonging to the second PUCCH group, the UE considers HARQ feedback of a HARQ process of a cell belonging to the second PUCCH group as ACK if the HARQ process successfully decodes a received TB, and the UE considers HARQ feedback of a HARQ process of a cell belonging to the second PUCCH group as NACK if the HARQ process is allocated to a deactivated cell, or a HARQ process has not received any TB, or a HARQ process fails in decoding the received TB.

The UE selects a second cell among the at least two cells with PUCCH resources in the second PUCCH group to transmit the multiplexed HARQ feedback (S1105).

And when the UE selects the second cell among the at least two cells with PUCCH resources in the second PUCCH group, the UE randomly selects the second cell with equal probability in the second PUCCH group, or the UE selects the second cell which has a highest priority in the second PUCCH group, or the UE selects the second cell which a best downlink cell channel quality in the second PUCCH group (e.g., RSRP, RSRQ), or the UE selects the second cell having a highest or the lowest cell index in the second PUCCH group.

Indeed, before the UE selects the second cell which has a highest priority, the UE receives the priority of the at least two cell with the PUCCH resources by receiving a Physical layer (PHY), Medium Access Control (MAC), or Radio Resource Control (RRC) signaling from a network.

In this case, the UE don't need to choose the first cell in the first PUCCH group because the first PUCCH group comprises only one first cell with PUCCH resource.

When the UE selects one PUCCH cell, the UE may exclude the following cell from the selection: i) the special cell, i.e. PCell or PSCell, ii) the PUCCH cell with worst channel quality, e.g., RSRP, RSRQ, iii) the PUCCH cells whose channel quality, e.g., RSRP, RSRQ, are below a threshold. In this case, the network can inform the UE of the threshold by a PHY/MAC/RRC signaling.

The UE transmits the first HARQ feedback on the first cell and the second HARQ feedback on the second cell (S1107).

In addition, the network configures a PUCCH cell to a UE by control signaling including following information: i) PUCCH resource, or ii) an indication of PUCCH Group to which the PUCCH cell belongs.

Thus, when the UE configures a cell with PUCCH resource in one of the first PUCCH group and the second PUCCH group, the UE receives the PUCCH resource with which the UE configures the cell or, an indication indicating which PUCCH group to which the cell belongs.

And also the network configures a non-PUCCH cell to a UE by control signaling including following information: an indication of PUCCH Group to which the non-PUCCH cell belongs.

Thus, when the UE configures a cell without PUCCH resource in one of the first PUCCH group and the second PUCCH group, the UE receives an indication indicating which PUCCH group to which the cell belongs.

FIGS. 12a and 12b are examples for transmitting multiplexed HARQ feedbacks in a carrier aggregation system according to embodiments of the present invention.

FIG. 12a is an example for one PUCCH configuration per Group.

The eNB configures multiple PUCCH cells for a UE by grouping the cells. In a group (hereafter, it is PUCCH Group), there is only one PUCCH cell and the UE transmits the HARQ feedbacks of all cells within the PUCCH Group via the PUCCH cell. UE possibly performs multiple PUCCH transmissions at one point in time.

In case of FIG. 12a, RAN2 need to discuss how to indicate the PUCCH Group and the cells belonging to the PUCCH Group, how to modify the PUCCH Group (removal/change of PUCCH Cell), etc. From UE point of view, as there can be multiple PUCCH Groups, multiple PUCCH transmission may occur at the same time. Depending on the number of PUCCH Groups, RAN2 may need to discuss how to support PUCCH transmissions on multiple cells in consideration of e.g., power limitation.

FIG. 12b is an example for Multiple PUCCH configuration per UE.

The eNB configures multiple PUCCH cells for a UE. The UE transmits the HARQ feedbacks of all cells via one of the PUCCH cells at one point in time.

As there can be multiple PUCCH cells, the PUCCH Cell which is to be used for HARQ feedback transmission at one point in time can be decided by either the eNB or the UE based on a certain criterion.

In our understanding, both models would achieve PUCCH offloading by configuring multiple PUCCH cells for a UE. However, model 1 (case of FIG. 12a) requires more standardization efforts on procedure/signalling design in order to support removal/change of PUCCH cell of PUCCH group and addition/removal/change of the PUCCH Group. In addition, model 1 increases the UE complexity in order to support simultaneous PUCCH transmissions on multiple PUCCH Cells with the limited UE power. Given that model 1 would apply to each Cell Group in DC, the number of simultaneous PUCCH transmissions would increase in DC. Then, a careful consideration is required to ensure the successful PUCCH transmission with the limited UE power. On the other hand, in model 2 (case of FIG. 12b), removal/change of PUCCH Cell would be simpler than that in model 1 because at least one cell, i.e., PCell, is always configured with PUCCH for all cells. Therefore, model 2 seems to provide more flexible and dynamic PUCCH offloading.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
configuring with a first Physical Uplink Control Channel (PUCCH) group and a second PUCCH group, wherein at least two cells are configured with PUCCH resources in each of the first PUCCH group and the second PUCCH group;
generating, by the UE, a first Hybrid Automatic Repeat Request (HARQ) feedback by multiplexing HARQ feedbacks of all cells belonging to the first PUCCH group;
generating, by the UE, a second HARQ feedback by multiplexing HARQ feedbacks of all cells belonging to the second PUCCH group;
selecting, by the UE, a first cell among the at least two cells with the PUCCH resources in the first PUCCH group;
selecting, by the UE, a second cell among the at least two cells with the PUCCH resources in the second PUCCH group; and
transmitting, by the UE, the first HARQ feedback on the first cell and the second HARQ feedback on the second cell.

2. The method according to claim 1, wherein when the UE multiplexes the HARQ feedbacks of all cells belonging to the first PUCCH group, the UE considers a HARQ feedback of a HARQ process of a cell belonging to the first PUCCH group as an Acknowledgement (ACK) if received Transport Blocks (TBs) associated with the HARQ process are successfully decoded, and the UE considers a HARQ feedback of a HARQ process of a cell belonging to the first PUCCH group as a Negative-Acknowledgement (NACK) if the associated HARQ process is allocated to a deactivated cell, or any TB associated with the HARQ process is not received, or the received TBs associated with the HARQ process are not successfully decoded, and
when the UE multiplexes the HARQ feedbacks of all cells belonging to the second PUCCH group, the UE considers a HARQ feedback of a HARQ process of a cell belonging to the second PUCCH group as an ACK if the received TBs associated with the HARQ process are successfully decoded, and the UE considers a HARQ feedback of a HARQ process of a cell belonging to the second PUCCH group as a NACK if the associated HARQ process is allocated to a deactivated cell, or any TB associated with the HARQ process is not received, or the received TBs associated with the HARQ process are not successfully decoded.

3. The method according to claim 1, wherein the UE selects the first cell as a cell having a highest priority among the at least two cells with PUCCH resources in the first PUCCH group, or
the UE selects the first cell as a cell having best downlink cell channel quality among the at least two cells with PUCCH resources in the first PUCCH group.

4. The method according to claim 1, wherein the UE selects the second cell as a cell having a highest priority among the at least two cells with PUCCH resources in the second PUCCH group, or
the UE selects the second cell as a cell having best downlink cell channel quality among the at least two cells with PUCCH resources.

5. The method according to claim 1, wherein the first cell and the second cell are not Primary Cells (PCells), or
the first cell is not a cell having worst channel quality in the first PUCCH group, and the second cell is not a cell having worst channel quality in the second PUCCH group, or
the first cell and the second cell are not cells having channel quality that is less than a threshold.

6. The method according to claim 1, wherein when the UE configures a cell with a PUCCH resource in one of the first PUCCH group and the second PUCCH group, the UE receives the PUCCH resource with which the UE configures the cell, or receives an indication indicating which PUCCH group to which the cell belongs.

7. The method according to claim 1, wherein when the UE configures a cell without a PUCCH resource in one of the first PUCCH group and the second PUCCH group, the UE receives an indication indicating which PUCCH group to which the cell belongs.

8. A method for a User Equipment (UE) operating in a wireless communication system, the method comprising:

configuring with a first Physical Uplink Control Channel (PUCCH) group and a second PUCCH group, wherein a first cell is configured with a PUCCH resource in the first PUCCH group, and at least two cells are configured with PUCCH resources in the second PUCCH group;

generating, by the UE, a first Hybrid Automatic Repeat Request (HARQ) feedback by multiplexing HARQ feedbacks of all cells belonging to the first PUCCH group;

generating, by the UE, a second HARQ feedback by multiplexing HARQ feedbacks of all cells belonging to the second PUCCH group;

selecting, by the UE, a second cell among the at least two cells with the PUCCH resources in the second PUCCH group; and transmitting, by the UE, the first HARQ feedback on the first cell and the second HARQ feedback on the second cell.

9. The method according to claim 8, wherein when the UE multiplexes the HARQ feedbacks of all cells belonging to the first PUCCH group, the UE considers HARQ feedback of a HARQ process of a cell belonging to the first PUCCH group as an Acknowledgement (ACK) if received Transport Blocks (TBs) associated with the HARQ process are successfully decoded, and the UE considers HARQ feedback of a HARQ process of a cell belonging to the first PUCCH group as Negative-Acknowledgement (NACK) if the associated HARQ process is allocated to a deactivated cell, any TB associated with the HARQ process is not received, or a HARQ process fails in successfully decoding the received TBs associated with the HARQ process, and when the UE multiplexes the HARQ feedbacks of all cells belonging to the second PUCCH group, the UE considers HARQ feedback of a HARQ process of a cell belonging to the second PUCCH group as an ACK if the received TBs associated with the HARQ process are successfully decoded, and the UE considers HARQ feedback of a HARQ process of a cell belonging to the second PUCCH group as a NACK if the associated HARQ process is allocated to a deactivated cell, or any TB associated with the HARQ process is not received, or the received TBs associated with the HARQ process are not successfully decoded.

10. The method according to claim 8, wherein the UE selects the second cell as a cell having a highest priority among the at least two cells with PUCCH resources in the second PUCCH group, or the UE selects the second cell as a cell having best downlink cell channel quality among the at least two cells with PUCCH resources.

11. The method according to claim 10, wherein the at least two cells are associated with respective priorities, and the priorities are received via Physical layer (PHY), Medium Access Control (MAC), or Radio Resource Control (RRC) signaling from a network.

12. The method according to claim 8, wherein the second cell is not a Primary PCell (PCell), or the second cell is not a cell having worst channel quality in the second PUCCH group, or the second cell is not a cell having channel quality that is less than a threshold.

13. The method according to claim 8, wherein when the UE configures a cell with a PUCCH resource in the second PUCCH group, the UE receives the PUCCH resource with which the UE configures the cell, or receives an indication indicating which PUCCH group to which the cell belongs.

14. The method according to claim 8, wherein when the UE configures a cell without a PUCCH resource in one of the second PUCCH group, the UE receives an indication indicating which PUCCH group to which the cell belongs.

15. A User Equipment (UE) operating in a wireless communication system, the UE comprising:
a transmitter;
a receiver; and
a processor operably coupled with the transmitter and the receiver and configured to:
configure with a first Physical Uplink Control Channel (PUCCH) group and a second PUCCH group, wherein at least two cells are configured with PUCCH resources in each of the first PUCCH group and the second PUCCH group,
generate a first Hybrid Automatic Repeat Request (HARQ) feedback by multiplexing HARQ feedbacks of all cells belonging to the first PUCCH group,
generate a second HARQ feedback by multiplexing HARQ feedbacks of all cells belonging to the second PUCCH group,
select a first cell among the at least two cells with PUCCH resources in the first PUCCH group,
select a second cell among the at least two cells with PUCCH resources in the second PUCCH group, and
control the transmitter to transmit the first HARQ feedback on the first cell and the second HARQ feedback on the second cell.

16. The UE according to claim 15, wherein when the processor multiplexes the HARQ feedbacks of all cells belonging to the first PUCCH group, the processor considers HARQ feedback of a HARQ process of a cell belonging to the first PUCCH group as an Acknowledgment (ACK) if received Transport Blocks (TBs) associated with the HARQ process are successfully decoded, and the processor considers HARQ feedback of a HARQ process of a cell belonging to the first PUCCH group as a Negative-Acknowledgement (NACK) if the associated HARQ process is allocated to a deactivated cell, or any TB associated with the HARQ process is not received, or the received TBs associated with the HARQ process are not successfully decoded, and when the processor multiplexes the HARQ feedbacks of all cells belonging to the second PUCCH group, the processor considers HARQ feedback of a HARQ process of a cell belonging to the second PUCCH group as an ACK if the received TBs associated with the HARQ process are successfully decoded, and the processor considers HARQ feedback of a HARQ process of a cell belonging to the second PUCCH group as NACK if the associated HARQ process is allocated to a deactivated cell, or any TB associated with the HARQ process is not received, or a HARQ process fails in successfully decoding the received TBs associated with the HARQ process.

17. The UE according to claim 15, wherein the processor selects the first cell as a cell having a highest priority among the at least two cells with PUCCH resources in the first PUCCH group, or the processor selects the first cell as a cell having best downlink cell channel quality among the at least two cells with PUCCH resources.

18. The UE according to claim 15, wherein the processor selects the second cell as a cell having a highest priority among the at least two cells with PUCCH resources in the second PUCCH group, or the processor selects the second cell as a cell having best downlink cell channel quality among the at least two cells with PUCCH resources in the second PUCCH group.

19. The UE according to claim 15, wherein the first cell and the second cell are not Primary Cells (PCells), or the first cell is not a cell having worst channel quality in the first PUCCH group, and the second cell is not a cell having worst channel quality in the second PUCCH group, or the first cell and the second cell are not cells having channel quality that is less than a threshold.

20. The UE according to claim 15, wherein when the processor configures a cell with a PUCCH resource in one of the first PUCCH group and the second PUCCH group, the processor controls the receiver to receive the PUCCH resource with which the UE configures the cell, or receive an indication indicating which PUCCH group to which the cell belongs, or when the processor configures a cell without a PUCCH resource in one of the first PUCCH group and the second PUCCH group, the processor controls the receiver to receive an indication indicating which PUCCH group to which the cell belongs.

* * * * *